United States Patent [19]
Gallant et al.

[11] Patent Number: 5,742,910
[45] Date of Patent: Apr. 21, 1998

[54] TELEADMINISTRATION OF SUBSCRIBER ID MODULES

[75] Inventors: John Kenneth Gallant; Tom Wrappe, both of Plano, Tex.

[73] Assignee: MCI Corporation, Washington, D.C.

[21] Appl. No.: 447,719

[22] Filed: May 23, 1995

[51] Int. Cl.$^6$ ................ H04Q 7/20; H04Q 7/32
[52] U.S. Cl. .......... 455/550; 455/563; 455/558; 455/575
[58] Field of Search ............... 379/58, 59, 355, 379/356, 357; 455/89, 90, 56.1, 67.1, 186.1, 550, 558, 563, 564, 575

[56] References Cited

U.S. PATENT DOCUMENTS

| | | |
|---|---|---|
| 5,046,082 | 9/1991 | Zicker et al. . |
| 5,097,502 | 3/1992 | Suzuki et al. . |
| 5,127,040 | 6/1992 | D'Avello et al. . |
| 5,134,717 | 7/1992 | Sogaard Rasmussen . |
| 5,159,625 | 10/1992 | Zicker .................... 379/59 |
| 5,266,782 | 11/1993 | Alanara et al. . |
| 5,276,729 | 1/1994 | Higuchi et al. . |
| 5,278,897 | 1/1994 | Mowery et al. . |
| 5,297,192 | 3/1994 | Gerszberg . |
| 5,325,429 | 6/1994 | Kurgan . |
| 5,335,276 | 8/1994 | Thompson et al. . |
| 5,371,493 | 12/1994 | Sharpe et al. . |
| 5,371,785 | 12/1994 | Marcinkiewicz . |
| 5,384,834 | 1/1995 | Sata et al. ................ 379/88 |
| 5,384,842 | 1/1995 | Tapping et al. . |
| 5,404,580 | 4/1995 | Simpson et al. ............ 455/89 |
| 5,467,401 | 11/1995 | Thompson ................. 455/89 |
| 5,524,134 | 6/1996 | Gustafson et al. .......... 379/58 |
| 5,630,159 | 5/1997 | Zancho ................... 455/558 |

*Primary Examiner*—Curtis Kuntz
*Assistant Examiner*—Binh K. Tieu

[57] ABSTRACT

A mobile telephone remote programming system and method includes a mobile telephone that has a subscriber ID module (SIM) which can store control data for voice message actuation and vocoder parameters. The telephone is adapted to receive digital programming information over a radio communication link. The programming information is adapted to modify the contents of the SIM to include updated voice message actuation data and/or vocoder data. The telephone uses the stored data to control voice message actuation and/or vocoder operation.

5 Claims, 3 Drawing Sheets

TELEADMINISTRATION OF SUBSCRIBER ID MODULES

BACKGROUND OF THE INVENTION

1. Field of the Invention

The present invention relates to the field of radiotelephony, and in particular, to the programming of service functions in mobile telephones having subscriber ID modules.

2. Description of the Prior Art

Mobile telephones are conventionally equipped with memories that hold personalized information about the user and the selected service options. Among the standard items that may be included in such memories are the user's name, personal identification number (PIN), mobile telephone number, and type of service. When a customer wishes to change the type of service, then either the entire telephone must be brought to the dealer, or, if the telephone is equipped with removable memory (e.g., a so-called subscriber ID module or "SIM"), then the SIM must be brought or sent to the dealer for programming. Examples of mobile telephones equipped with removable memories may be found in the following patents, the disclosures of which are incorporated herein by reference:

U.S. Pat. No. 5,404,580 Simpson et al
U.S. Pat. No. 5,353,328 Jokimies
U.S. Pat. No. 5,325,429 Kurgan
U.S. Pat. No. 5,335,276 Thompson et al
U.S. Pat. No. 5,266,782 Alanara There have also been suggestions in the past to allow remote programming of the memories (i.e., programming over the radio communication channels). Examples of mobile telephones capable of being remotely programmed may be found in the following patents, the disclosures of which are also incorporated herein by reference:

U.S. Pat. No. 5,297,192 Gerszberg
U.S. Pat. No. 5,046,082 Zicker et al

The present invention relates to a method for downloading control parameters from a distant control center system to a SIM.

Mobile telephones are also often used in conjunction with voice messaging systems, since the user of the mobile telephone may not always be present at the telephone to receive calls. In such voice messaging systems, if the user is not present, the caller is connected to a voice message system that provides a greeting and stores the caller's message. The user can later employ the mobile telephone to retrieve the stored message by first dialing a telephone number and then entering additional data (such as a personal identification number). It often happens, however, especially when the user travels with the mobile telephone over long distances, that the telephone number to be called by the user to retrieve the voice messages may change. It is then necessary for the user to dial a different telephone number, which may be difficult to do if the telephone call is placed from a moving vehicle. Therefore, it would be desirable for the actuation information for the voice message system to be automatically programmable by the central control station without user involvement.

Mobile telephones also typically include a vocoder for digitizing the user's voice and compressing the digital information for radio transmission. A plurality of digital parameters control the digitizing sample rate and the type of compression performed by the vocoder. These parameters can greatly affect the way the voice will sound through the communication link. In the past, the vocoder parameters were determined by fixed hardware in the mobile telephone. With the advent of multiple levels of communication service and a variety of mobile telephone hardware manufacturers, it has become desirable to provide mobile telephones with programmable vocoder capabilities. As with the above considerations, it is especially desirable to enable the vocoder parameters to be remotely programmable over the communication link.

SUMMARY OF THE INVENTION

Therefore, an object of the present invention is to provide a mobile telephone having a subscriber ID module capable of remote programming through a radio communication link. Another object of the invention is to enable remote programming of control data for voice message actuation through a mobile telephone. Another object of the invention is to enable remote programming of vocoder parameters for a mobile telephone under control of a distant control center.

These and other objects are accomplished in the present invention which comprises a mobile telephone remote programming system wherein the mobile telephone comprises a subscriber ID module (SIM) that can store control data for voice message actuation and vocoder parameters; means to receive digital programming information over a radio communication link; means to modify the contents of the SIM to include updated voice message actuation data and/or vocoder data; and means to use the stored data to control voice message actuation and/or vocoder operation.

DESCRIPTION OF THE PREFERRED EMBODIMENT

Figure 1:
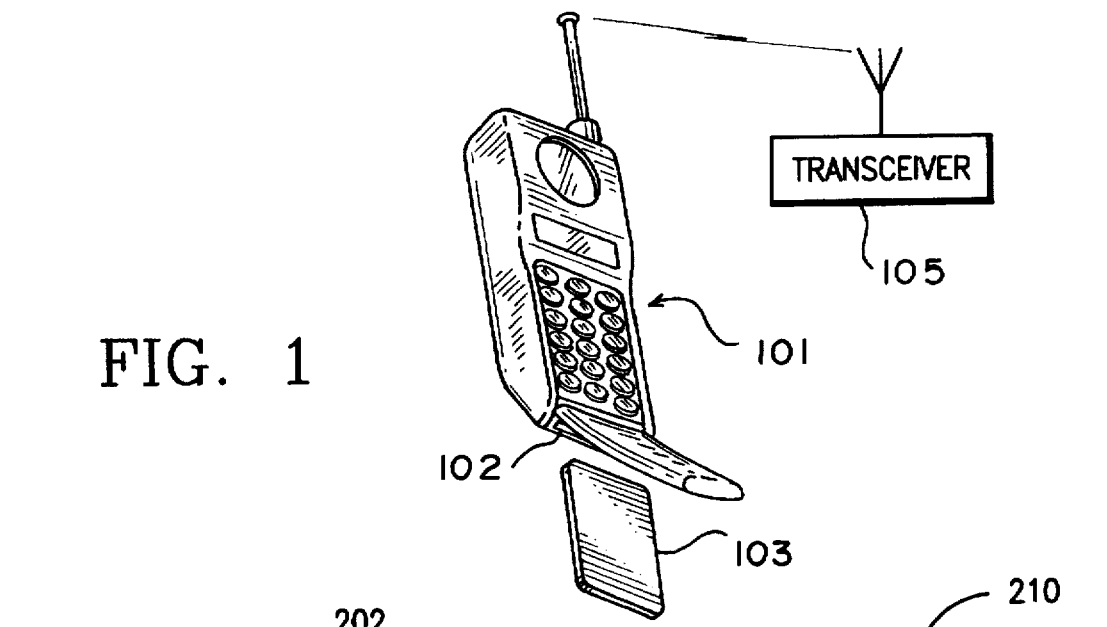
FIG. 1 is a prior art mobile telephone modified to incorporate the principles of the present invention.
Figure 2:
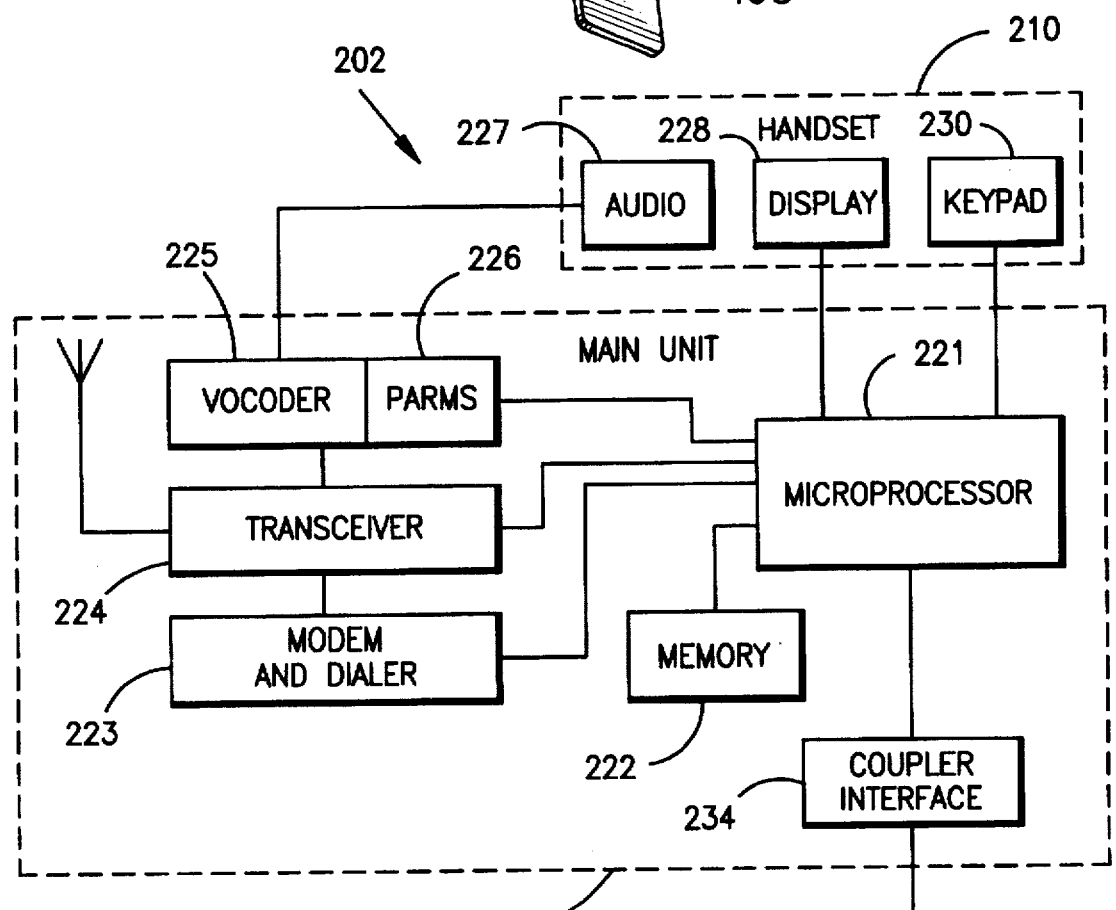
FIG. 2 is a block diagram of the modified circuitry of FIG. 1.

FIG. 1 shows a mobile telephone in the preferred embodiment, generally indicated as 101 which includes a slot 102 for receipt of a subscriber ID module (SIM) 103. SIM 103 may contain any conventional memory means, including magnetic memory or semiconductor memory; but in the preferred embodiment, SIM 103 holds non-volatile semiconductor memory such as an EEPROM, and is in the general shape of a credit card or so-called "smart card." The memory includes storage space to hold subscriber parameters, such as the following:

1 SIM serial number
2 Name or ID of subscriber
3 Telephone number
4 Personal identification number (PIN)
5 Encryption information
6 Country parameters
7 Voice message telephone number
8 Voice message password
9 Vocoder type and parameters FIG. 2 shows the circuitry of a preferred embodiment of the invention. The mobile telephone comprises handset 210, main unit 204 (that may be combined into a single unit), and SIM 232. The handset includes a display 228, keypad 230, and audio unit 227 (including microphone, speaker, and amplifier, not shown). The main unit includes microprocessor 221 with working RAM 222 that communicates with the display and keypad in the handset, with modem 223, transceiver 224 and vocoder 225 through parameter buffer 226, and SIM 232 through coupler interface 234. SIM 232 includes a storage memory 233 containing space for the desired subscriber information.

Figure 3:
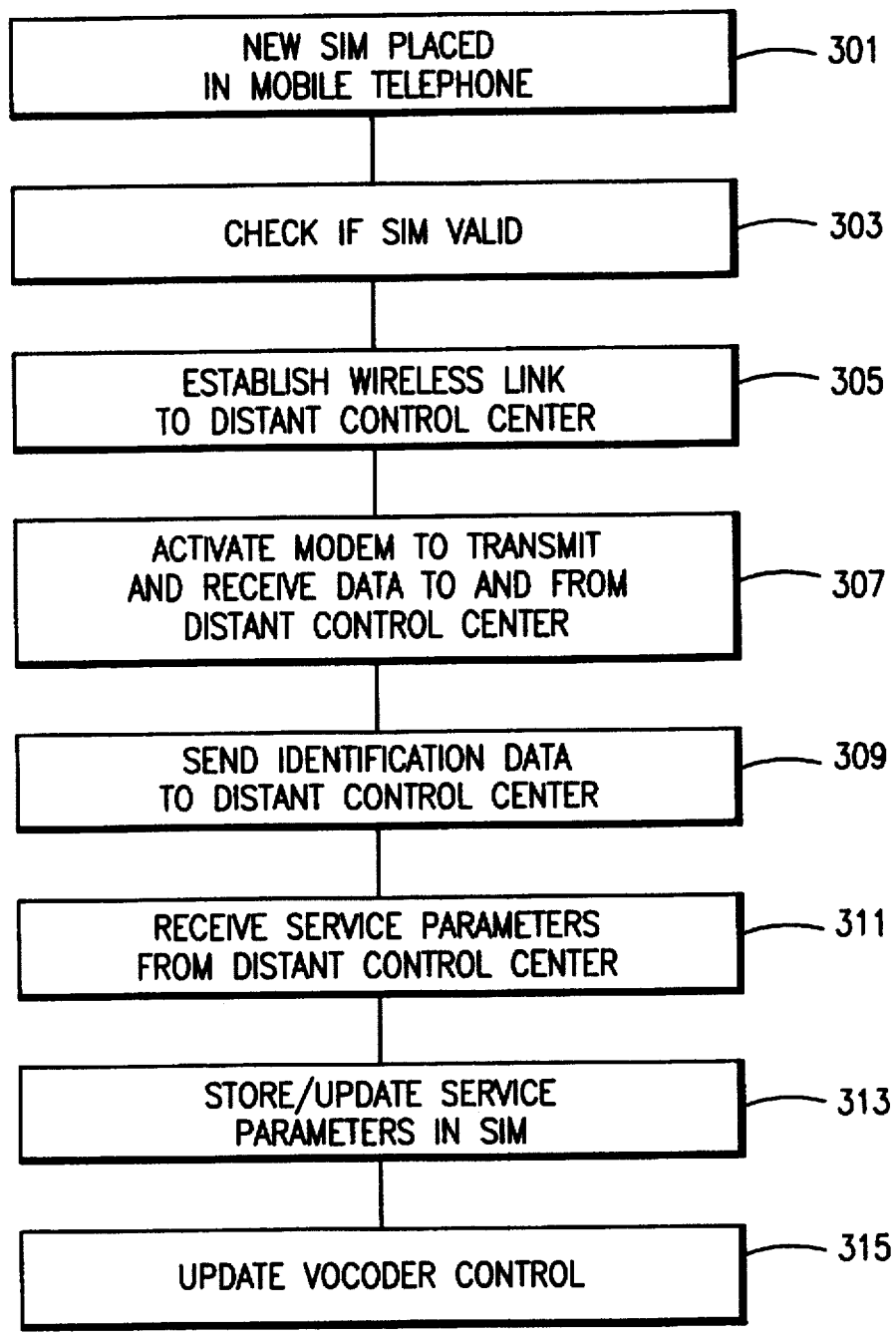
FIG. 3 is a flow diagram for implementing the invention in the mobile telephone of FIG. 1.
Figure 4:
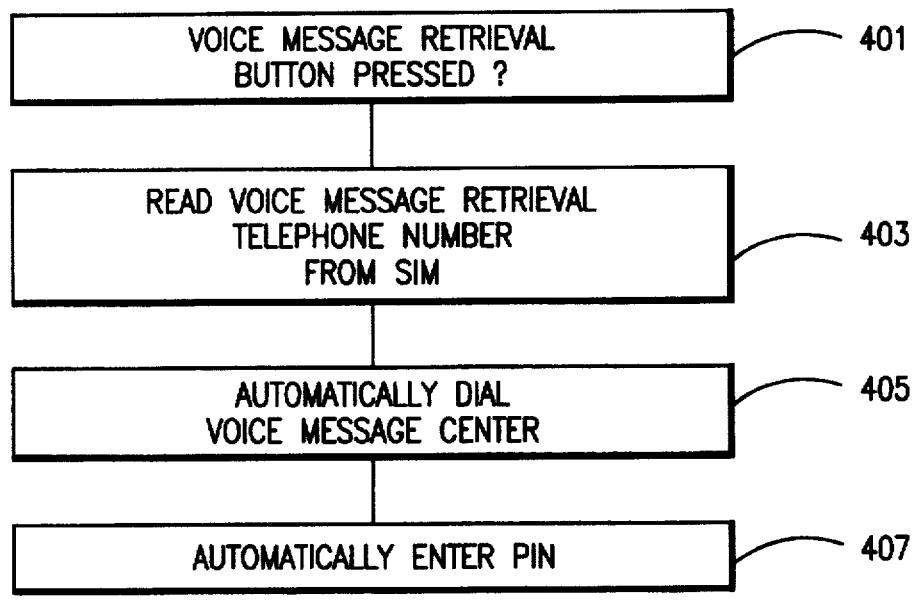
FIG. 4 is a flow diagram for using the mobile telephone in FIG. 1 to check stored voice messages.
Figure 5:
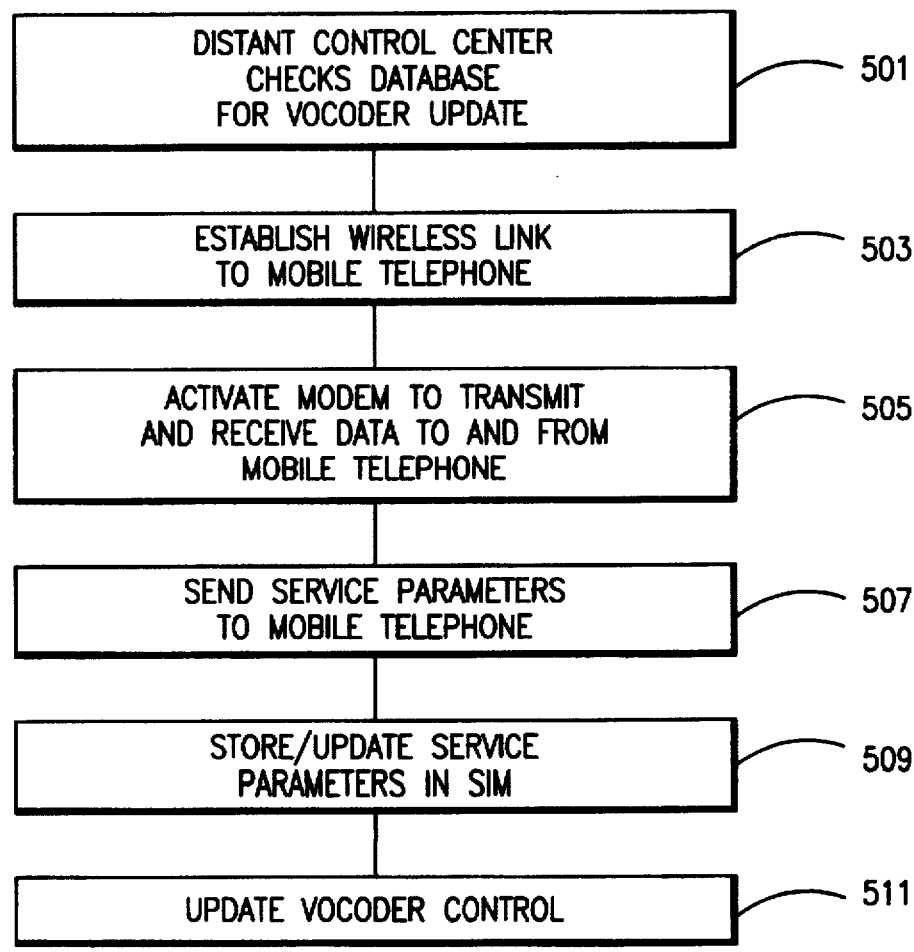
FIG. 5 is a flow diagram for a updating service parameters for the mobile telephone of FIG. 1.

The operation of a mobile telephone in the present invention may be seen in FIGS. 3–5 in conjunction with FIGS. 1 and 2. Turning to FIG. 3, when the user places SIM 232 into the mobile telephone in step 301, microprocessor 221 checks the SIM to determine if it is valid in step 303, and then dials a distant control center in step 305. Once a radio communication link is established with the control center, microprocessor 221 employs a digital channel or alternatively a modem 223 to initiate a data communication link with the control center in step 307. The microprocessor reads identification data (such as the subscriber's ID) from SIM 232, and sends the subscriber information to the control center in step 309. The control center reviews the subscriber information, and looks up the service parameters in a central database. The service parameters are returned over the radio communication link to microprocessor 221 through modem 223 in step 311. Microprocessor 221 modifies the contents of SIM memory in accordance with the received service parameters in step 313. Included in the information received from the central database are the voice message telephone number, the voice message password, and the vocoder type and parameters.

After SIM 232 has been programmed with the new service parameters, microprocessor 221 reads the vocoder parameters from the SIM memory, and sends them to vocoder 225 through parameter buffer 226 in step 315. Once the vocoder parameters have been properly set up, the handset is available for normal audio use.

Turning to FIG. 4, when the subscriber wishes to check if voice messages have been stored, he presses a button (not shown) on keypad 230 designated for voice message activation in step 401. Alternatively, a subscriber may retrieve voice mail by making an appropriate choice on the terminal display 228 or employing a special dialing sequence from the keypad 230. Microprocessor 221 reads the voice message telephone number from SIM 232 in step 403 and activates the MODEM and dialer 223 to commence a telephone call to the number retrieved from the SIM in step 405. Once the link has been established, the microprocessor sends the additional information (e.g., PIN if required) to initiate voice message retrieval in step 407.

Turning to FIG. 5, the distant control center periodically checks its database in a step 501 to determine if any of the subscriber parameters stored in SIM 232 need to be changed. If so, the distant control center may initiate a telephone call to the subscriber's mobile telephone in steps 503, 505, and thereby send a command to microprocessor 221 that contains a string of new parameter information for the microprocessor in step 507 to store and update vocoder control in SIM 232 in steps 509, 511. Alternatively, the distant control center may wait until the next time that the subscriber decides to use the telephone before sending the new data. By either of these methods, if the distant control center must change the telephone number and authorization sequence for the voice message retrieval, the subscriber's telephone will thereby be altered in accordance with the new information.

It can be seen from the above description that the invention provides a convenient way to automatically program and reprogram the SIM to include useful information such as the vocoder parameters or the voice message retrieval sequence. By programming the SIM from a distant location, the role of the SIM may thereby be expanded to include more information, and information of a more rapidly changing nature than previously possible. For example, the subscriber may obtain the latest and highest quality vocoder operation without requiring a hardware change.

While the present invention has been described in terms of the preferred embodiment, which entails remote programming of the SIM to control vocoder and voice message retrieval functions, it should be clear to those skilled in the art that other remote programming capabilities may also be practiced using similar techniques, and therefore the scope of the invention should be understood not from the description of the preferred embodiment, but only from the claims appended herewith.

What is claimed is:

1. A mobile telephone comprising:
    a vocoder with changeable control parameters;
    automatic dialing means responsive to stored digital information;
    a subscriber ID module removably mated to a slot of said telephone having storage space to hold subscriber pertinent data including at least data for controlling said vocoder and for actuation of voice message retrieval;
    means for receiving digital programming data through a radio communication channel;
    means for programming the storage space in said subscriber ID module according to the received digital programming data;
    means for modifying the changeable control parameters of the vocoder according to the data of vocoder parameters stored in said storage space; and
    means using said voice message retrieval data stored in said storage space for automatically dialing a telephone number and retrieving voice message.

2. The mobile telephone of claim 1 further comprising:
    means enabling remote control of the changeable control parameters.

3. The mobile telephone of claim 2 wherein the means enabling remote control is from a distant control center.

4. In a mobile telephone having a vocoder for digitizing and compressing voice data wherein the vocoder has a plurality of changeable control parameters, a method for remotely administering the vocoder parameters comprising:
    establishing a digital communication link between said mobile telephone and a distant control center;
    downloading vocoder control parameters from said distant control center to a removably mated storage module in said mobile telephone; and
    modifying the vocoder parameters in said mobile telephone in accordance with said vocoder control parameters stored in said storage module.

5. In a mobile telephone having a keyboard and automatic dialing means responsive to digital data stored in a subscriber ID module removably mated to said telephone, the method for automatically retrieving voice messages from a distant voice message center comprising:
    establishing a digital communication link between said mobile telephone and a distant control center;
    downloading voice message retrieval control data from said distant control center to said subscriber ID module mated to said mobile telephone;

storing said voice message retrieval control data in said subscriber ID module; and in response to pressing a designated key on said keyboard, automatically dialing and retrieving voice messages from said voice message center using the voice message retrieval control data stored in said subscriber ID module.

* * * * *